March 25, 1941. A. L. WOLFE 2,236,241
FISH LURE AND THE PROCESS OF MANUFACTURE THEREOF
Filed Sept. 18, 1939

INVENTOR
ARTHUR L. WOLFE
BY
Wheeler, Wheeler & Wheeler
ATTORNEYS

Patented Mar. 25, 1941

2,236,241

UNITED STATES PATENT OFFICE 2,236,241

FISH LURE AND THE PROCESS OF MANUFACTURE THEREOF

Arthur L. Wolfe, Racine, Wis.

Application September 18, 1939, Serial No. 295,386

4 Claims. (Cl. 43—48)

My invention relates to improvements in fish lures and the process of manufacture thereof.

The object of my invention is to produce fish lures which have a close imitation of living insects or other creatures, and at the same time to provide waterproof, durable bodies and appendages capable of enduring long-time use.

To accomplish the purposes and objectives set forth above, it is one of the important features of my invention that all parts of my lures are bonded in place by adhesives and, in fact, substantial portions of the body parts are built up by means of an adhesive which not only bonds the structural elements of my lure together, but also supplies structural shape to the completed product.

Another object of my invention is to so construct the basic structural elements of my lures as to provide an extremely strong body and strong attachment of the body extremities.

In the drawing.

Like parts are identified by the same reference characters throughout the several views.

As indicated above, I have found that it is an advantage to construct fish lures simulating as nearly as possible the creatures upon which fish naturally feed, and one of the important features of my invention is the provision of body structure built up out of an adhesive-like material which will, when cured, provide not only the necessary bonding function, but will also provide contour and bulk to round out the body and accessory parts into an extremely closely simulated creature with toughly bonded elements.

In carrying out my invention, I build my insect or other creature body upon the shank 10 of a fish hook 11, and I treat the shank 10 with a preliminary coating of shellac. I then wrap upon the tacky shellac a fabric-like foundation material 12, the fibrous nature of which is adapted to be bonded to the shank of the hook by the shellac. The quantity of shellac upon the shank 10 is such as to impregnate the fibers of the foundation material 12 which lie immediately adjacent the shank, but the exterior surface of the foundation 12 remains open-fibered to receive the special body building adhesive referred to above.

Figure 1:
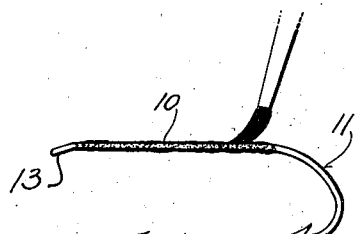
Figure 1 is a side elevation of a fish hook upon which my initial treatment and application of fabric is partially complete.
Figure 2:
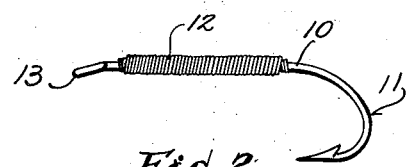
Figure 2 is a view similar to Figure 1, but with the foundation of my lure complete upon the shank of the fish hook.

The foundation having been completed as shown in Figure 2, I thereafter attach all body and accessory or extremity portions of the creature together by means of body building adhesive, the preferred form of which is latex. Latex not only gives a resilient bonding adhesive result, but also provides bulk and color, if desired, to round out and complete the insect or creature which is to be simulated.

Figure 3:
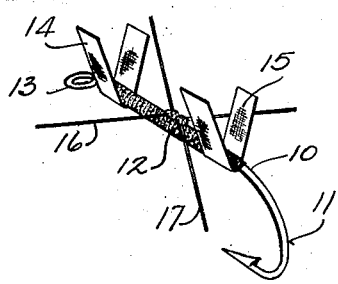
Figure 3 is a perspective of the fish hook shown in Figure 2, but with certain structural and body extremity elements in position.

I apply a proper amount of latex to the exterior of the foundation 12 and I place my hook 11 in the position shown in my drawing in readiness for the application of the remaining portions of the body and accessories of the particular insect to be built upon the foundation. In my description hereinafter, I shall refer to the relative position of the parts as shown in the drawing, the barb of the hook being "down" and the shank of the hook extending forwardly to the eye 13 at the "front" of the insect. "Beneath" the foundation 12 at either end of the shank 10, I apply my saddle bifurcated members 14 and 15. These may be made of cloth fabric-like material and are applied while the latex upon the exterior of the foundation 12 is tacky. At appropriate positions, I apply leg filaments 16 and 17, as indicated most clearly in Figure 3.

A small drop of latex or cement is sufficient to cause these filaments to adhere temporarily. I then proceed to the next step of my process which is indicated in the drawing at Figure 4, namely, the application of the body 18 to the foundation 12. The body is superimposed upon the foundation, and, therefore, impinges directly upon the filaments 16 and 17 which will become the legs of the insect.

Figure 4:
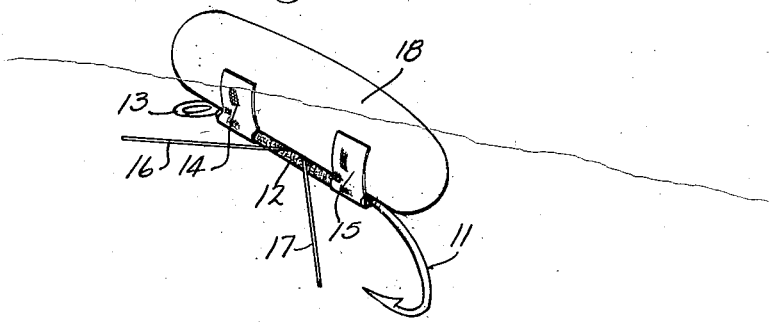
Figure 4 is a view similar to Figure 3, with the body of a lure in place upon the structure shown in Figure 3.

The body itself which I form as a capsule-like hollow element, before application to the foundation, is caused to be coated with a tacky latex and in the next step of my process I bring the saddle members 14 and 15 up around the body 18 as shown in Figure 4, thus binding the body to the foundation not only by the adhesive quality of the latex or other glue but also by reason of the wrapping of the saddles about the body.

Figure 5:
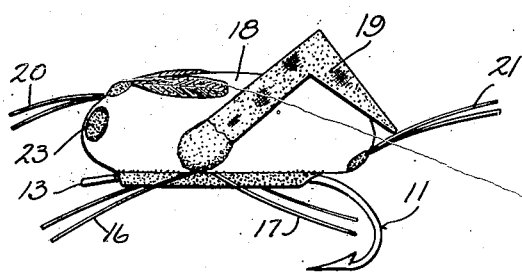
Figure 5 is a side elevation of the hook shown in Figure 1, with a complete cricket body constructed thereon.
Figure 6:
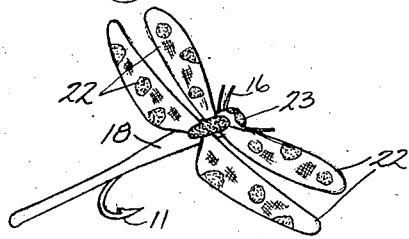
Figure 6 is a view similar to Figure 5, but with a dragon fly body complete upon the shank of the hook.

Additional latex is then applied along the body at the line of its conjunction with the foundation 12, thus giving complete semblance of unity in appearance between the body and the foundation. Upon this apparently unitary structure, I am then prepared to build or secure the accessory or appending elements of the body, such as the legs 19 as shown in the cricket body completed as in Figure 5, and antennae 20 and stylets 21 peculiar to the cricket. If the insect is to resemble a fly or bee, as shown in Figure 6, wings 22 made of rubberized cloth will readily and permanently take their place, since the latex adhesive bonding is especially suited to this material. Eyes 23 may be formed of colored rubber and caused to adhere to the rubber body 18 by means of latex, or they may be built up by means of colored latex.

There is much importance to be attached to the fact that the bodies of my lures are separate, integral, capsule-like members formed as tough, resilient units applied to, but not forming part of, the foundation 12, thus permitting me to install between the foundation 12 and the body 18 any particular appendages or devices needed to complete the simulation of creatures which have many or varied lower extremities, and I provide great strength to my structure by using the saddle members 14—15.

The fact that my insect body 18 is hollow lends a certain amount of buoyancy to my imitation insect for fish lure purposes.

Legs 19, and any other appendages or body extremities, may be made of rubber, colored or otherwise, to carry out the simulation of a particular creature, and since rubber adapts itself easily to the configuration desired, and since latex is a natural adhesive for rubber materials, I have found that I am able by means of my process and construction principles to bond and build any insect or creature which may be used as a lure, and my completed product is water-proof, tough and lasting in most rigorous use.

I claim:

1. A fish lure including a shank-like member having a foundation material adhesively bonded thereto and thereabout a saddle member bonded intermediate its ends to said foundation beneath the shank, and a body upon said foundation with the extremities of the saddle extended thereabout, said body foundation and saddle being adhesively bonded together.

2. Fish lures of the class described including a tubular body, a fish hook having its shank extending longitudinally of the body, means for connecting the shank to the outer surface of the body so that the hook is positioned below the same, separate body appendages arranged to be connected to the body, and a solidifying waterproof bulb supplying adhesive for securing the hook, body, and body appendages together to provide a unitary structure simulating a living creature, said adhesive also filling in the exposed space between the shank and the body to round out and structurally shape the parts to simulate a living creature.

3. Fish lures of the class described including a flexible elongated hollow rubber body, a fish hook having its shank extending longitudinally of the body, means for connecting the shank to the outer surface of the body so that the hook is positioned below the same, separate rubberized body appendages arranged to be connected to the body, and a solidifying latex bulk supplying adhesive for securing the hook, body, and body appendages together to provide a unitary structure simulating a living creature, said adhesive also filling in the exposed space between the shank and the body to round out and structurally shape the parts to simulate a living creature.

4. A fishing lure comprising a hook, foundation means surrounding the shank of the hook, one or more bifurcated members secured to the foundation means and having the bifurcations thereof extending outwardly therefrom, lure elements positioned on the foundation, a body on the foundation, and adhesive means permanently upon the body and securing the body to the bifurcations and the foundation and maintaining the lure elements permanently between the body and the foundation means.

ARTHUR L. WOLFE.

CERTIFICATE OF CORRECTION.

Patent No. 2,236,241. March 25, 1941.

ARTHUR L. WOLFE.

It is hereby certified that error appears in the printed specification of the above numbered patent requiring correction as follows: Page 2, second column, line 15, claim 2, for the word "bulb" read --bulk--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.